United States Patent [19]
Nakata

[11] Patent Number: 5,399,835
[45] Date of Patent: Mar. 21, 1995

[54] LASER WORKING METHOD AND AN APPARATUS THEREFOR

[75] Inventor: Yoshinori Nakata, Yamanashi, Japan
[73] Assignee: Fanuc Ltd., Yamanashi, Japan
[21] Appl. No.: 64,071
[22] PCT Filed: Sep. 25, 1992
[86] PCT No.: PCT/JP92/01224
 § 371 Date: May 20, 1993
 § 102(e) Date: May 20, 1993
[87] PCT Pub. No.: WO93/05922
 PCT Pub. Date: Apr. 1, 1993

[30] Foreign Application Priority Data
 Sep. 27, 1991 [JP] Japan .................. 3-274999
[51] Int. Cl.⁶ ............................................. B23K 26/02
[52] U.S. Cl. ........................................... 219/121.78
[58] Field of Search ............. 219/121.78, 121.77, 219/121.74, 121.75

[56] References Cited
 U.S. PATENT DOCUMENTS
 4,358,655  11/1982  Spohnheimer .............. 219/121.62
 5,159,169  10/1992  Nishikawa et al. ............ 219/121.6

FOREIGN PATENT DOCUMENTS
 0373055  6/1990  European Pat. Off. .
 4327394  11/1992  Japan ..................... 219/121.78

Primary Examiner—C. L. Albritton
Attorney, Agent, or Firm—Staas & Halsey

[57] ABSTRACT

A method and apparatus for working a workpiece with a laser and a working head designed for movement, even though the length of an optical path from a laser oscillator to a working point (laser head) varies as the working head moves. A condensing optical component, formed of a lens and the like, is inserted in the middle of the optical path, and the condensing optical component is shifted so as to be within a workable region for proper working of a workpiece depending on the length of the optical path from the laser oscillator to the working head during the working. That is, a laser beam can be narrowed by shifting the position of the condensing optical component so that its propagation characteristic corresponds to the varied optical path length. In this arrangement, the amount of shift required of the condensing optical component is so small that a compact laser working machine can be obtained.

6 Claims, 5 Drawing Sheets

| i | OPTICAL PATH LENGTH l | LENS POSITION L |
|---|---|---|
| 1 | $l_1$ | $L_1$ |
| 2 | $l_2$ | $L_2$ |
| 3 | $l_3$ | $L_3$ |
| ⋮ | ⋮ | ⋮ |
| i | $l_i$ | $L_i$ |
| ⋮ | ⋮ | ⋮ |
| n | $l_n$ | $L_n$ |

LASER WORKING METHOD AND AN APPARATUS THEREFOR

BACKGROUND OF THE INVENTION

1. Field of the Invention

The present invention relates to a laser working method and a laser working apparatus for cutting or welding workpieces, and more particularly, to a working method and apparatus in which a working head is moved for working.

2. Description of the Related Art

As a laser working machine and a laser working method in which a laser beam is applied to a workpiece to subject the workpiece to working, such as cutting, welding, etc., and a method and an apparatus characterized by a moving workpiece and fixed working head from which the laser beam is applied to the workpiece are known. For example, conventionally known are a method and an apparatus in which the workpiece to be worked is moved by utilizing a table which is movable in the directions perpendicularly intersecting X and Y axes.

Also known are a working method and an apparatus in which the working head is moved in the directions of the X, Y and Z axes for working, with the workpiece fixed.

The system, in which the working head is moved in the directions of the X, Y and Z axes with the workpiece fixed, requires a space for the movement of the workpiece, which is twice as long and wide as the workpiece or more. If the workpiece is a small one, this space will cause no special problem. If the size of the workpiece to be worked is as large as 5 m by 5 m, for example, a space of 10 m by 10 m is needed as a working space, so that the laser working machine is required to have larger dimensions.

If the system in which the working head is moved with the workpiece fixed is used, in order to solve the problem of the aforesaid space, however, the distance of laser beam propagation from a laser oscillator to a working point, that is, the optical path length, varies as the working head moves. If the optical path length varies, the diameter and quality of the laser beam change, so that working conditions, such as the optimum focal distance and focus depth, and the thickness of workable workpieces change. Thus, the working will become difficult, or will become unable to be effected under optimum conditions.

Thus, a system has been also developed in which the processing head can be moved without changing the optical path length, as shown in FIG. 6 (PRIOR ART) (see Published Examined Japanese Patent Application No. 1-55076). According to this system, a pair of reflectors 31, 31 for refracting a laser beam at 180° are arranged in a laser beam propagation path, ranging from a laser oscillator 1 to a condensing lens 16 of a processing head 15, and the paired reflectors 31, 31 are moved for a distance, half as long as the movement stroke of the processing head 15, so that the optical path length will always remain constant.

As described above, if the processing head is fixed, a wide working space is required. If the processing head is designed for movement, on the other hand, the laser beam propagation characteristic changes, so that optimum working cannot be effected. According to the aforesaid system described in Published Examined Japanese Patent Application No. 1-55076, in which the processing head can be moved without changing the optical path length, the additional use of the two reflectors entails an increase in cost and power loss, and further such a system requires, in particular, a space for the movement of the paired reflectors for refracting tile laser beam at 180°. If a workpiece to be worked is large-sized, this space must be so wide that a compact laser working machine cannot be obtained.

SUMMARY OF THE INVENTION

The object of the present invention is to provide a laser working method and a laser working apparatus capable of minimizing a necessary space for laser working.

In order to achieve the above object, according to a method of the present invention, a laser beam generated from a laser oscillator is transmitted to a working head having a condensing lens, and the working head is moved to subject a workpiece to laser working, the method comprising steps of providing a condensing optical component for changing the laser propagation characteristic in a laser propagation path from the laser oscillator to the condensing lens, and moving the condensing optical component as the distance of laser transmission from the laser oscillator to the condensing lens changes with the movement of the working head so that the laser beam incident on the condensing lens is always within a suitable range for the working.

Preferably, the condensing optical component is formed of a lens or of a reflector and a curved reflector.

Further, an apparatus according to the present invention, a laser beam generated from a laser oscillator is transmitted to a working head having a condensing lens, and the working head is moved to subject a workpiece to laser working, the apparatus comprising a condensing optical component for changing the laser propagation characteristic arranged in a laser propagation path between the laser oscillator and the condensing lens, a drive means for moving the condensing optical component, a distance computing means for computing the distance of the laser propagation path from the laser oscillator to the working head, a condensing optical component position setting means for setting the position of the condensing optical component in accordance with the distance computed by the distance computing means, and a drive control means for controlling the drive means to move the condensing optical component to the position set by means of the condensing optical component position setting means.

Preferably, the condensing optical component position setting means is formed of a memory stored with the condensing optical component position in accordance with the laser propagation path distance from the laser oscillator to the working head, or means for computing the condensing optical component position on the basis of the laser propagation path distance.

Preferably, the condensing optical component is formed of a lens or of a reflector and a curved reflector.

According to the method of the present invention, as described above, the condensing optical component for changing the laser propagation characteristic, provided in the laser propagation path, is controlled for being automatically shifted when the optical path length changes according to the movement of the working head, whereby the laser beam incident on the condensing lens of the working head is always within a workable region which ensures uniform working. Since only a small amount of shift is required of the condensing optical component for being controlled, the means characteristic of the present invention can be incorporated into a conventional laser working machine without requiring any substantial increase in the working space of the machine.

DETAILED DESCRIPTION OF THE PREFERRED EMBODIMENTS

Figure 2:
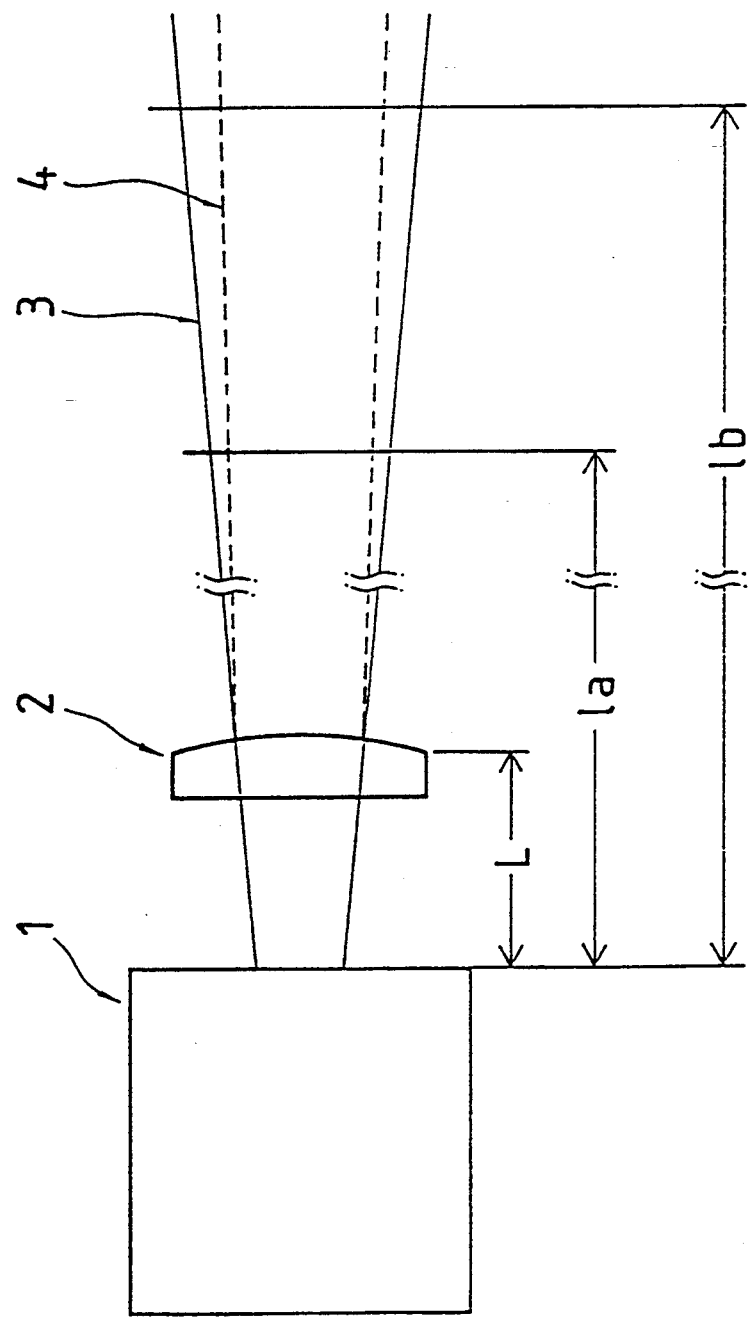
FIG. 2 is a diagram for illustrating the principle of the present invention.

Referring first to the diagram of FIG. 2, the principle of the present invention will be described. A laser beam 3 emitted from a laser oscillator 1 is narrowed down by means of a condensing optical component (lens) 2 for changing the laser propagation characteristic, and a laser beam 4 emitted from the condensing optical component 2 changes its propagation characteristic. However, an optical path length (distance on an optical path from the laser oscillator to a condensing lens of a working head) appropriate for a workpiece to be uniformly worked by the laser beam is within a fixed range. Referring to FIG. 2, this range is shown as a workable region ranging from an optical path length $l_a$ to an optical path length $l_b$. If the optical path length increases or decreases beyond or short of the workable region (between $l_a$ and $l_b$), this will cause not only the change in the laser beam diameter but also the change in the laser propagation characteristic.

Thereupon, if the condensing optical component 2 is moved for a shift α along the optical path, starting from the position at a distance corresponding to an optical path length L measuring from the laser oscillator 1, to a position (L+α) so that the condensing lens is situated in a new workable region (i.e., region ranging from an optical path length $(l_a+\beta)$ to $(l_b+\gamma)$), corresponding to the moved position, the diameter and quality of the beam incident on the condensing lens can always be maintained at optimum condition so that optimum working can always be effected despite the movement of the working head.

Even though the working head and the condensing head are moved entailing the change in the optical path length in this manner, the optimum working can always be effected by simply adjusting the position of the condensing optical component 2 along the optical path in response to the variation. Since the condensing optical component 2 is required to be moved for only a short distance, not so large a space is needed for the whole apparatus that a compact laser working machine can be obtained.

Figure 1:
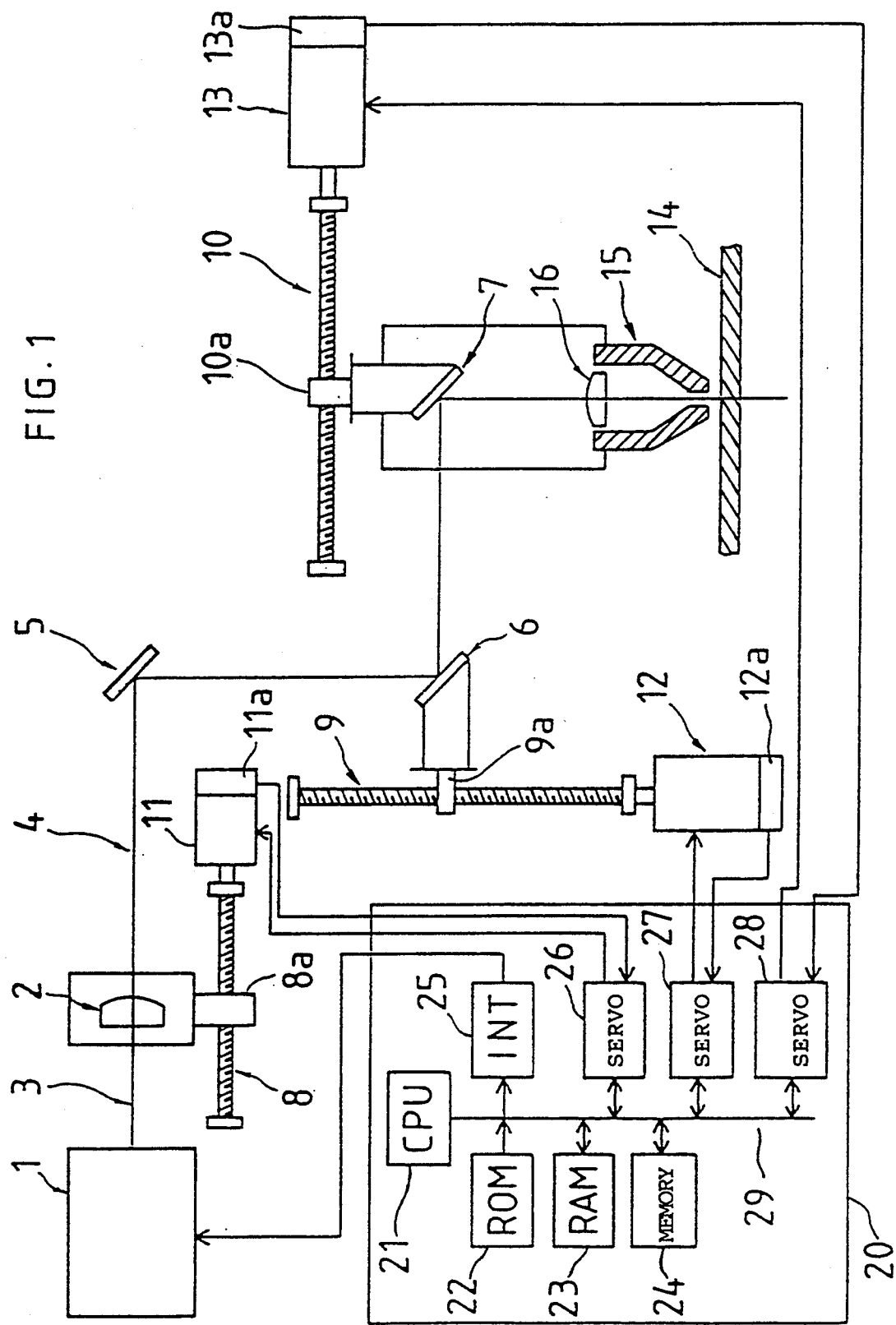
FIG. 1 is a diagram for illustrating an arrangement of a laser working machine according to one embodiment of the present invention.

Referring now to FIG. 1, a laser working machine according to one embodiment of the present invention, which embodies the aforementioned principle, will be described. In the present embodiment, a working head 15 is arranged so as to be allowed to move in the directions of X and Y axes which extend at right angles to each other. The machine comprises the laser oscillator 1; the long-focus lens 2 as the condensing optical component for changing the laser beam propagation characteristic, disposed in a laser propagation path; a servomotor 11 for moving the lens 2; a transmission mechanism including a ball screw 8, nut 8a, etc.; a servomotor 12 for moving the working head 15 and a reflector 6 in the X-axis direction; a transmission mechanism including a ball screw 9, nut 9a, etc.; a servomotor 13 for moving the working head 15 in the Y-axis direction; a transmission mechanism including a ball screw 10, nut 10a, etc.; and a numerical control device (NC device) as a control device for controlling the laser working machine. The laser beam emitted from the laser oscillator 1 passes through the lens 2, and is refracted at right angles by reflectors 5, 6 and 7 to reach a condensing lens 16 which is arranged in the working head. The servomotors 11, 12 and 13 are fitted, respectively, with pulse coders 11a, 12a and 13a for detecting the position and speed. In FIG. 1, numeral 14 denotes a workpiece.

In FIG. 1, the reflector 6 is shown as being movable in the vertical direction of FIG. 1 by means of the servomotor 12. Actually, however, the ball screw 9 extends in the direction perpendicular to the drawing plane so that the reflector 6 is moved in the X-axis direction, which is perpendicular to the drawing plane, by means of the nut 9a which is in mesh with the ball screw 9, and a column, which is fitted with the Y-axis servomotor 13, ball screw 10, working head 15, etc., is also moved in the X-axis direction perpendicular to the drawing plane.

The laser beam 3 emitted from the laser oscillator 1 passes through the lens 2 to be converted into the laser beam 4 with a modified propagation characteristic, which is refracted at 90° at a time by the reflectors 5, 6 and 7, and lands at the condensing lens 16. Thereupon, the laser beam is focused by the condensing lens 16, and is applied to the workpiece 14 to effect cutting operation. In this case, when the working head 15 is moved by means of the ball-screw-nut mechanisms 9, 9a, 10 and 10a as the servomotors 12 and 13 are driven, the length of an optical path (laser beam propagation distance) from the laser oscillator 1 to a working point or the working head varies, so that the diameter and quality of the laser beam change accordingly. According to the present invention, however, as mentioned before, the servomotor 11 is driven depending on the movement of the working head, and the lens 2 is moved by means of the ball-screw-nut mechanisms 8 and 8a to change the propagation characteristic of the laser beam 3, thereby adjusting the optical path length, varied with the movement of the working head, so as to be within a new workable region after the change of the propagation characteristic.

A processor 21 of the numerical control device 20 is connected, by means of a bus 29, with a ROM 22 stored with a system program, a RAM 23 for temporarily storing data, a battery-backed-up nonvolatile memory 24 for storing a working program and tables (mentioned later) loaded with moved positions of the lens 2, an interface 25 connected to the laser oscillator 1, and servo circuits 27, 28 and 29 for driving the servomotors 11, 12 and 13, respectively. The servo circuits 26, 27 and 28 are supplied with position and speed feedback signals from the pulse coders 11a, 12a and 13a which are attached to their corresponding servomotors 11, 12 and 13, whereby position and speed control is effected in the same manner as in the conventional case.

The processor 21 delivers a laser working command to the laser oscillator 1 through the interface 25. On receiving this command, the laser oscillator 1 emits a laser beam so that the laser beam is applied from the working head 15 to the workpiece 14 via the lens 2, reflectors 5, 6 and 7, and condensing lens 16. On the other hand, based on the working program stored in the nonvolatile memory 24, the processor 21 causes the servo circuits 27 and 28 to drive the servomotors 12 and 13, thereby driving the working head 15 and the reflectors 6 and 7. Further, the servomotor 11 is driven in response to the movement of the working head, and the lens 16 is moved by means of the ball-screw-nut mechanisms 8 and 8a so that a workable region is provided for each optical path length.

Figures 3, 4:
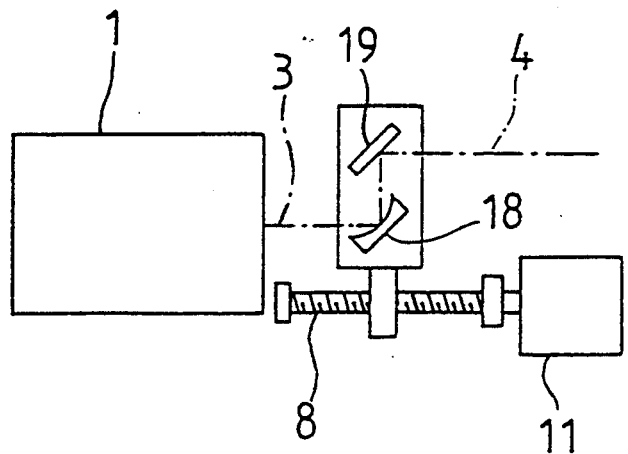
FIG. 3 is a diagram for illustrating a table stored with lens positions compared with optical path lengths according to one embodiment of the present invention.
FIG. 4 is a diagram for illustrating the principal part of another embodiment of the present invention.

FIG. 3 is a diagram for illustrating a table T in the nonvolatile memory 24, which is stored with positions of the lens 2 compared with optical path lengths. The positions of the lens 2 are stored so that workable regions are provided corresponding to optical path lengths 1. Thus, the workable regions $l_a$ to $l_b$ vary depending on the properties of the laser oscillator and the material and thickness of the workpieces to be worked. When the configuration and properties of the laser oscillator 1 are determined, positions L of the lens 2 such that the working point for the optical path length is within the workable region are experimentally obtained in accordance with the thickness of the workpieces of each material, and the table T is prepared by storing the resulting values, as shown in FIG. 3.

More specifically, the workable range is divided into n number of parts, ranging from the minimum optical path length to the maximum that the laser working machine can take, that is, from the lower limit to the upper limit of the range. These divided optical path lengths 1 are successively stored from an address 1 by priority of shortness, and the lens positions L for the individual regions are stored. If the optical path length l is smaller than $l_1$, the lens position is stored as $L_1$. If the optical path length ranges from $l_1$ to $l_2$, the lens position is stored as $L_2$. If the optical path length l is given by $l_{i-1} < l \leq l_i$, the lens position is stored as $L_i$.

Tables T of this kind are prepared individually for some ranges of the material and thickness of the workpieces, and are stored beforehand in an auxiliary memory such as a floppy disk. When the workpiece to be worked and its thickness are determined, the corresponding table T is loaded into the nonvolatile memory 24 by means of a disk driver (not shown) or the like. Alternatively, the table T may be selected by inputting the workpiece to be worked and its thickness after previously storing those various tables in a ROM.

Figure 5:
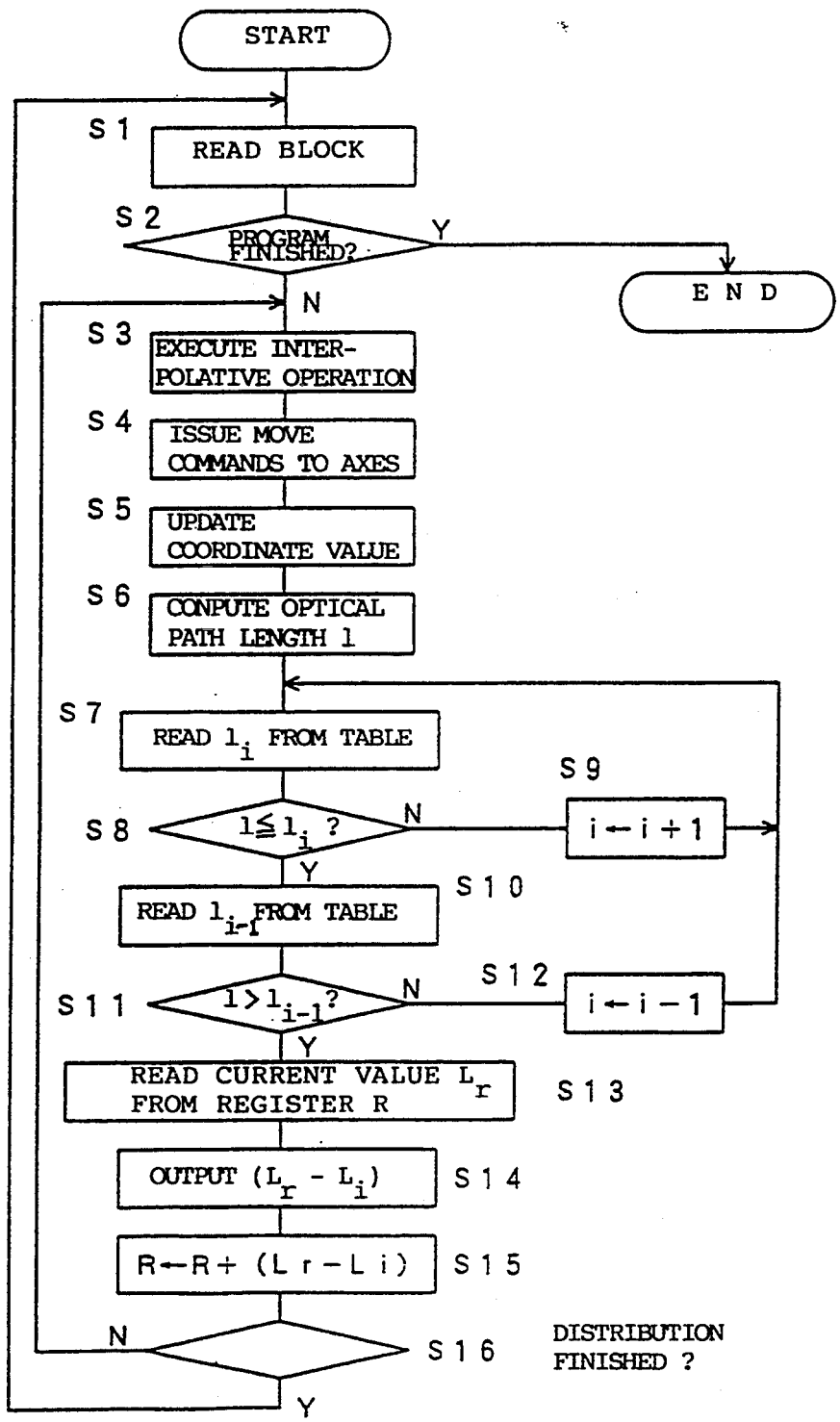
FIG. 5 is a diagram for illustrating the principal part of processings to be executed by means of a processor of a control device according to one embodiment of the present invention.
Figure 6:
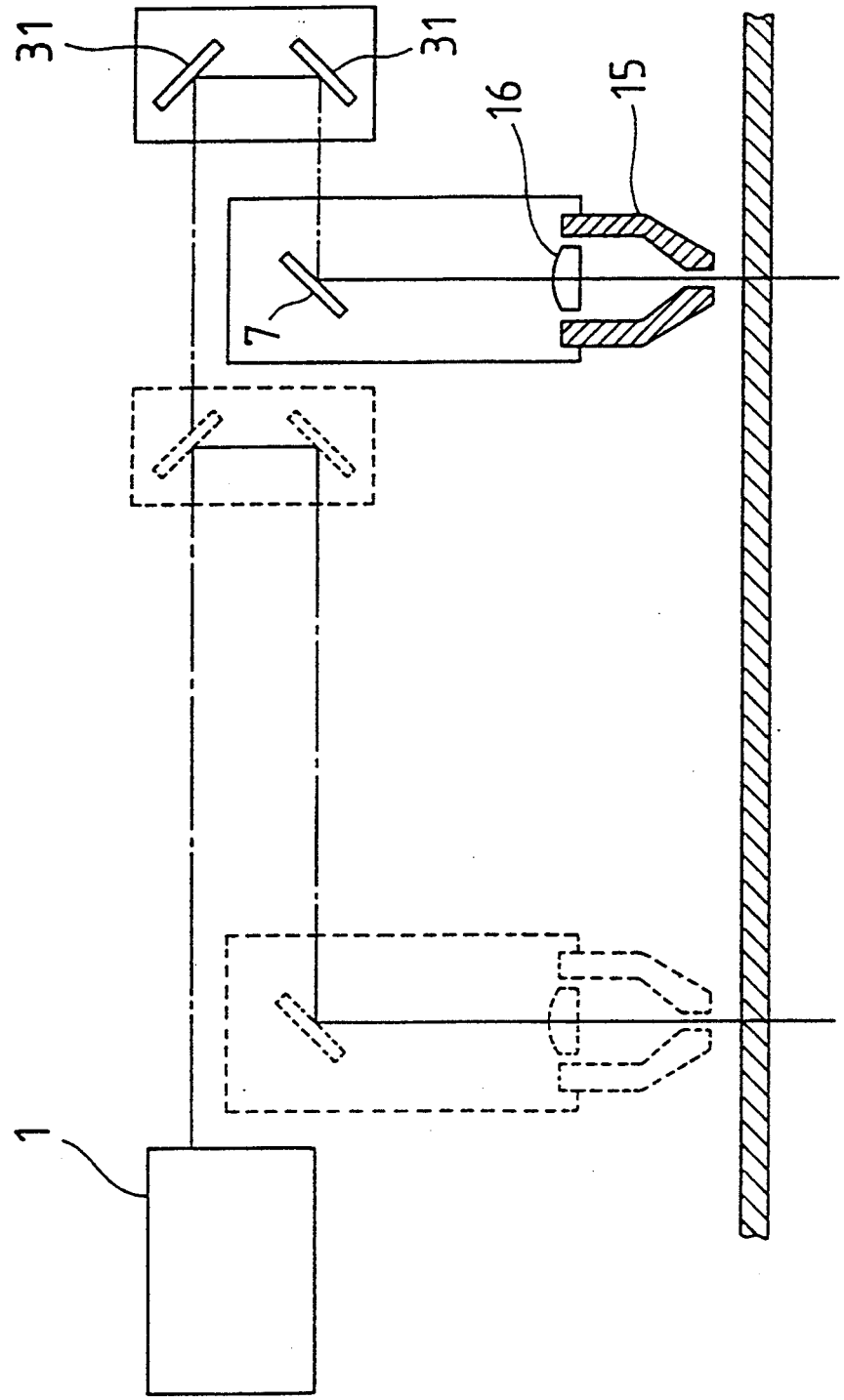
FIG. 6 (PRIOR ART) is a diagram for illustrating a conventional system for fixing the optical path length.

Referring now to the flow chart of FIG. 5, laser working operation according to the present embodiment will be described.

One block is read from the working program, and it is determined whether or not this block is a block for a program termination command (Steps S1 and S2). If the program is not finished, interpolative operation is executed on the basis of a move command of the read block to obtain a move command value for each axis (Steps S3 and S4). Subsequently, the move command value for each axis is added to the value in a current value register for each axis, thereby updating the coordinate value for each axis (Step S5). Then, the optical path length l is computed according to the coordinate value for each axis. More specifically, the optical path length l can be obtained by adding the coordinate values of the axes, for which the optical path length is to be changed, to the optical path length for the position of origin. In the present embodiment, the X and Y axes are the axes for which the optical path length is to be changed, so that the optical path length l can be obtained by adding the respective coordinate values for the X and Y axes to the optical path length for the position of origin (Step S6). Also for other axes for which the optical path length is to be changed, the coordinate values for the other axes are added.

Subsequently, the optical path length $l_i$ is read from an address i of the table T in the memory, given by an index i which is initialized at "1" when the power is turned on (Step S7), and it is determined whether or not the optical path length l computed in Step S6 is not longer than the read optical path length $l_i$ (Step S8). If the length l is not shorter, the index i is incremented by "1" (Step S9), and the program returns to Step S7, whereupon the optical path length $l_i$ is read. Thereafter, the processings of Steps S7 to S9 are repeated. When the computed optical path length l becomes not longer than the optical path length $l_i$ read from the table T, the optical path length $l_{i-1}$ is read from an address (i−1) whose index is smaller than the index i in the table by "1" (Step S10), and it is determined whether or not the computed optical path length l is longer than the read optical path length $l_{i-1}$ (Step S11). If the length l is not longer, the index i is decremented by "1" (Step S12), whereupon the program returns to Step S7. That is, a value for the index i (address) is retrieved so that the computed optical path length l is between the values $l_{i-1}$ and $l_i$ stored in the table T ($l_{i-1} < l \leq l_i$) in the processings of Steps S7 to S12. When this value is found out, the lens position $L_i$ stored in this address is read out.

Subsequently, a position $L_r$ of the lens 2 stored in a current value register R is read out (Step S13), a value obtained by subtracting the value of the current position $L_r$ from the value of the lens position $L_i$ read from the table T is delivered to the servo circuit 26 of the servomotor 11, thereby driving the servomotor 11 to move the lens 2 (Step S14). Then, the aforesaid value of the movement stroke ($L_i - L_r$) is added to the value in the register R to update the current value (Step S15), and whether the distribution is finished or not is determined (Step S16). If the distribution is not finished, the program returns to Step S3. If the distribution is finished, the program returns to Step S1, whereupon the aforesaid processings are executed until the working program is finished.

Thus, by changing the location of the lens 2 in accordance with the optical path length, uniform working can be effected with the working point continually kept within the workable region.

Although the long-focus lens is used as the condensing optical component for converting the propagation characteristic of the laser beam in the embodiment described above, any other condensing optical component may be used instead, provided it has the same function as the lens 2. For example, a curved reflector may be used for the purpose. FIG. 4 shows an embodiment in which this curved reflector is used. The laser beam 3 emitted from the laser oscillator 1 is refracted at 90°, narrowed down by means of the curved reflector 18, further refracted at 90° by means of a reflector 19, and delivered as the laser beam 4 with a converted propagation characteristic. The curved reflector 18 and the reflector 19 may be combined to form a condensing optical component so that the same function as that of the aforesaid lens 2 can be fulfilled by moving these condensing optical components 18 and 19 by means of the servomotor 11 and the ball-screw-nut mechanisms 8 and 8a. Further, the curved reflector 18 and the reflector 19 may be arranged contrariwise (i.e., the laser beam 3 from the laser oscillator 1 may be refracted at 90° by means of the reflector 19 and outputted after being narrowed down by the reflector 18). In each of the embodiments described above, the position of the condensing optical component is experimentally obtained with respect to the optical path length, and is stored as data base, as shown in FIG. 3. Alternatively, however, the position of the condensing optical component may be obtained in accordance with an approximate expression based on the optical path length as a variable.

Furthermore, in connection with the above-described embodiments, the working head has been described as being movable in the X- and Y-axis directions. However, the present invention may also be applicable to the case where the working head is movable in the direction of only one axis or in the directions of three axes or more, that is, to any arrangement in which the optical path length varies.

Although the ball-screw-nut mechanism is used as the means for moving the working head, reflectors, condensing optical component, etc., such mechanism may be replaced with any other mechanism, e.g., a rack-and-pinion, for converting a rotatory motion into a linear motion.

It is claimed:

1. A laser working method in which a laser beam generated from a laser oscillator is transmitted to a working head having a condensing lens, and the working head is moved to subject a workpiece to laser working, said method comprising the steps of:

providing a single lens between the laser oscillator and the condensing lens of the working head for changing a laser propagation characteristic in a laser propagation path from said laser oscillator to the condensing lens;

moving said working head to subject said workpiece to laser working; and moving said single lens as the distance of laser transmission from said laser oscillator to the condensing lens changes with a movement of said moving working head, to always maintain an optimum laser beam diameter and quality incident on said condensing lens for optimumly working the workpiece.

2. A laser working apparatus in which a laser beam generated from a laser oscillator is transmitted to a working head having a condensing lens, and the working head is moved to subject a workpiece to laser working, comprising:

a single lens located between the laser oscillator and the condensing lens of the working head, to change a laser propagation characteristic in a laser propagation path between said laser oscillator and the condensing lens of the working head;

first drive means for moving said working head to subject said workpiece to laser working;

second drive means for moving said single lens;

distance determining means for determining a distance of the laser propagation path between said laser oscillator and a position of the moving working head moved by said first drive means;

lens position setting means for setting a position of said single lens in accordance with the distance determined by said distance determining means; and drive control means for controlling said second drive means to move said single lens to the position set by said lens position setting means.

3. A laser working apparatus according to claim 2, wherein said lens position setting means includes a memory which stores the single lens position in accordance with the laser propagation path distance from the laser oscillator to the working head.

4. A laser working apparatus according to claim 2, wherein said lens position setting means includes means for determining the single lens position on the basis of the laser propagation path distance from the laser oscillator to the working head.

5. A laser working method for transmitting a laser beam generated from a laser oscillator to a working head including a condensing lens, said working head being moved to subject a workpiece to laser working, said method comprising the steps of:

providing a condensing optical component including a reflector and a curved reflector between said laser oscillator and said condensing lens of said working head, for changing a laser propagation characteristic in a laser propagation path from said laser oscillator to said condensing lens; and moving said condensing optical component as the distance of laser transmission from said laser oscillator to said condensing lens changes with a movement of said working head, to always maintain an optimum laser beam diameter and quality incident on said condensing lens for optimumly working said workpiece.

6. A laser working apparatus for transmitting a laser beam generated from a laser oscillator to a working head including a condensing lens, said working head being moved to subject a workpiece to laser working, comprising:

a condensing optical component, including a reflector and a curved reflector, located between said laser oscillator and said condensing lens of said working head to change a laser propagation characteristic in a laser propagation path from said laser oscillator to said condensing lens of said working head;

drive means for moving said condensing optical component;

distance determining means for determining a distance of said laser propagation path between said laser oscillator and said condensing lens of said working head;

condensing optical component position setting means for setting a position of said condensing optical component in accordance with said distance determined by said distance determining means; and drive control means for controlling said drive means to move said condensing optical component to said position set by said condensing optical component position setting means.

* * * * *